(12) United States Patent
Seipold

(10) Patent No.: US 8,452,500 B1
(45) Date of Patent: May 28, 2013

(54) MULTI-RANGE HYDRO-MECHANICAL TRANSMISSION

(75) Inventor: John M. Seipold, Glasford, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 13/407,280

(22) Filed: Feb. 28, 2012

(51) Int. Cl.
*G06F 17/00* (2006.01)

(52) U.S. Cl.
USPC .......... 701/55; 475/75; 475/79; 475/84; 475/85; 475/83; 475/204; 475/218; 475/263; 475/279; 475/290; 475/330; 475/331; 475/332; 475/337; 475/343; 74/410; 74/640

(58) Field of Classification Search
USPC ............ 701/55; 475/75, 79, 81, 82, 83, 204, 475/218, 263, 279, 290, 330, 331, 332, 337, 475/343, 347; 74/410, 640
See application file for complete search history.

(56) References Cited

U.S. PATENT DOCUMENTS

| | | | | |
|---|---|---|---|---|
| 3,969,958 A * | 7/1976 | Miyao et al. | | 475/82 |
| 4,480,502 A * | 11/1984 | Nembach | | 180/243 |
| 4,976,665 A | 12/1990 | Hagin et al. | | |
| 5,730,678 A * | 3/1998 | Larkin | | 475/81 |
| 5,830,097 A * | 11/1998 | Larkin | | 475/72 |
| 6,450,912 B2 | 9/2002 | Todeschini | | |
| 6,790,159 B1 * | 9/2004 | Buchanan et al. | | 477/86 |
| 6,819,997 B2 * | 11/2004 | Buchanan et al. | | 701/67 |
| 6,887,184 B2 * | 5/2005 | Buchanan et al. | | 477/174 |
| 6,898,992 B2 * | 5/2005 | Koenig et al. | | 74/335 |
| 7,058,496 B2 * | 6/2006 | Ho et al. | | 701/55 |
| 7,220,210 B2 | 5/2007 | Soh | | |
| 7,402,119 B2 | 7/2008 | Kamada et al. | | |
| 7,488,269 B2 | 2/2009 | Tabata et al. | | |
| 7,524,255 B2 | 4/2009 | Matthews | | |
| 7,905,810 B2 | 3/2011 | Hukill et al. | | |
| 7,912,617 B2 | 3/2011 | Wright et al. | | |
| 8,056,324 B2 * | 11/2011 | Wiley et al. | | 60/290 |
| 2005/0101426 A1 | 5/2005 | Sugino et al. | | |
| 2009/0036248 A1 | 2/2009 | Mueller et al. | | |
| 2009/0062056 A1 | 3/2009 | Kato et al. | | |
| 2010/0304912 A1 | 12/2010 | Sime | | |
| 2010/0323843 A1 | 12/2010 | Wittkopp et al. | | |

OTHER PUBLICATIONS

Peide et al., Elastohydrodynamic Lubrication Research on Planetary Gear Transmission, 2011, IEEE, p. 70-73.*
Hu ran, The Computer-Aided Assembly of Reducer With Offset Swinging Planetary Drive of Bevel Gear by UG, 2010, IEEE, p. 619-623.*
Mingzhu et al., Efficiency Analysis of an Innovative Multi-range Hydromechanical Continuously Variable Transmission, 2009, IEEE, p. 170-174.*
Li et al., Optimal Configuration Design for Hydraulic Split Hybrid Vehicles, 2010, IEEE, p. 5812-5817.*

* cited by examiner

*Primary Examiner* — McDieunel Marc
(74) *Attorney, Agent, or Firm* — Leydig, Voit & Mayer

(57) ABSTRACT

A powertrain includes an engine and a continuously variable transmission including a planetary gear arrangement and a variator. An input drives the variator and the planetary gears. A first planetary output gear is connected to the first output of the planetary gear arrangement. A second planetary output gear is connected to the first output, and a third planetary output gear is connectable by a first clutch to a second output of the planetary gear arrangement. A first output member is connected to the third planetary output gear, a second clutch releasably connects the first output member with the first planetary output gear, a third clutch connects the first output member with the second planetary output gear, a fourth clutch connects the second output member with the first planetary output gear, and a fifth clutch connects the second output member with the second planetary output gear.

20 Claims, 4 Drawing Sheets

MULTI-RANGE HYDRO-MECHANICAL TRANSMISSION

TECHNICAL FIELD

This patent disclosure relates generally to continuously variable transmissions and, more particularly, to hydro-mechanical transmissions for use in vehicle or machine powertrains.

BACKGROUND

Multi-range hydro-mechanical transmissions are known for providing smooth shifting between various different gear ratios in machines and other vehicles. Shifting in a typical hydro-mechanical transmission is accomplished by the use of two or more clutches that can synchronously disengage one gear ratio while simultaneously engaging another gear ratio. The synchronization of clutch speed can be achieved by use of synchronizing assemblies, which can be embodied in various forms. One known structure for a synchronizing assembly includes gears connected to clutches that are configured to selectively engage two or more rotating elements in a transmission such that a rotating element associated with the gear to be engaged is made to rotate at the same speed as a rotating element associated with the gear already engaged. In this way, the transmission of torque and power between gears can be shifted smoothly and without an abrupt step.

One example of a known hydro-mechanical transmission can be seen in U.S. Pat. No. 7,530,913 (the '913 patent), which was granted on May 12, 2009. The '913 patent describes a "Multi-Range Hydromechanical Transmission" that includes an input member, a hydrostatic transmission and a mechanical transmission. The mechanical transmission of the '913 patent includes first and second synchronizing assemblies for synchronizing first or second output members of the transmission to a combined output speed from the input member and the hydrostatic transmission. In one embodiment of the transmission described in the '913 patent, first and second clutch assemblies alternately engage to transfer power from the synchronized output member to a final drive.

Although the transmission described in the '913 patent effectively shifts between forward and reverse gears, it includes three synchronizers and two clutches when embodied in a transmission having five gear ratios, for example, three forward and two reverse gears. During operation, one synchronizer and one clutch are engaged for each gear ratio, which means that the second clutch and the remaining two synchronizers are idle. Thus, each gear change requires the engagement of one of the idle synchronizers and the disengagement of another. Such synchronizer engagement and disengagement at each gear shift can cause wear in the friction material of the synchronizers, especially for high-torque applications such as in heavy trucks and earth working machines and other heavy machines. Moreover, the relative complexity of synchronizers decreases the reliability and increases the cost of the transmission.

SUMMARY

The disclosure describes, in one aspect, a machine powertrain that includes an engine connected to a continuously variable transmission. The continuously variable transmission includes a planetary gear arrangement having an input, and at least a first output and a second output. The transmission further includes a variator including a variable displacement hydraulic pump operably associated with a hydraulic motor, which is configured to drive a gear set of the planetary gear arrangement. An input shaft driven by the engine is configured to drive the variator and the input of the planetary gear arrangement. A third planetary output gear is connectable via a first clutch to the second output of the planetary gear arrangement. A second planetary output gear is connected to the second output of the planetary gear arrangement, and a first planetary output gear is connected to the first output of the planetary gear arrangement. The transmission further includes a first output member and a second output member. The first output member is connected to the third planetary output gear, and the first and second output members are interconnected with a transmission output. A second clutch of the transmission is configured to releasably connect the first output member with the first planetary output gear. A third clutch is configured to releasably connect the first output member with the second planetary output gear. A fourth clutch is configured to releasably connect the second output member with the first planetary output gear, and a fifth clutch is configured to releasably connect the second output member with the second planetary output gear.

In another aspect, the disclosure describes a continuously variable transmission. The continuously variable transmission includes a planetary gear arrangement having a first output and a second output, and further including first and second gear sets. Each gear set includes a sun gear, a carrier gear, and a ring gear. The ring gear of the first gear set is connected to the carrier gear of the second gear set. The second output of the transmission is connected to the sun gears of the first and second gear sets, and the first output of the transmission is connected to the ring gear of the first gear set and to the carrier gear of the second gear set. The transmission further includes a variator. The variator includes a variable displacement hydraulic pump operably associated with a hydraulic motor, which has an output connected to the ring gear of the second gear set. An input shaft is connected to the variable displacement hydraulic pump of the variator and to the carrier gear of the first gear set. The transmission further includes first, second and third planetary output gears of the planetary gear arrangement. The third planetary output gear is connectable via a first clutch to the first output of the planetary gear arrangement, the second planetary output gear is connected to the first output of the planetary gear arrangement, and the first planetary output gear is connected to the second output of the planetary gear arrangement.

The transmission further includes first and second output members that are interconnected with a transmission output. The first output member is connected to the third planetary output gear. In addition to the first clutch, a second clutch is configured to releasably connect the first output member with the first planetary output gear. A third clutch is configured to releasably connect the first output member with the second planetary output gear. A fourth clutch is configured to releasably connect the second output member with the first planetary output gear, and a fifth clutch is configured to releasably connect the second output member with the second planetary output gear.

In yet another aspect, the disclosure describes a method for operating a continuously variable transmission. The method includes determining whether a shift from a current gear selection to a new gear selection is required. When a shift is required, parameters of the new gear selection are analyzed and compared to corresponding parameters of the current gear selection. A current gear selection clutch is disengaged and a new gear selection clutch is engaged within a short time period. The disengaging and engaging operations are modulated, and a variator contribution is further modulated to ensure that a gear speed difference between the current gear selection and the new gear selection is substantially zero.

DETAILED DESCRIPTION

This disclosure relates to hydro-mechanical transmissions and, more particularly, to hydro-mechanical transmissions that include a plurality of hydraulic clutches configured to provide synchronous shifting without the use of synchronizers. Although the embodiments disclosed herein are described in the context of earthmoving machines, they are suitable for other applications such as automotive applications, light, medium and heavy duty trucks and the like.

Figure 1:
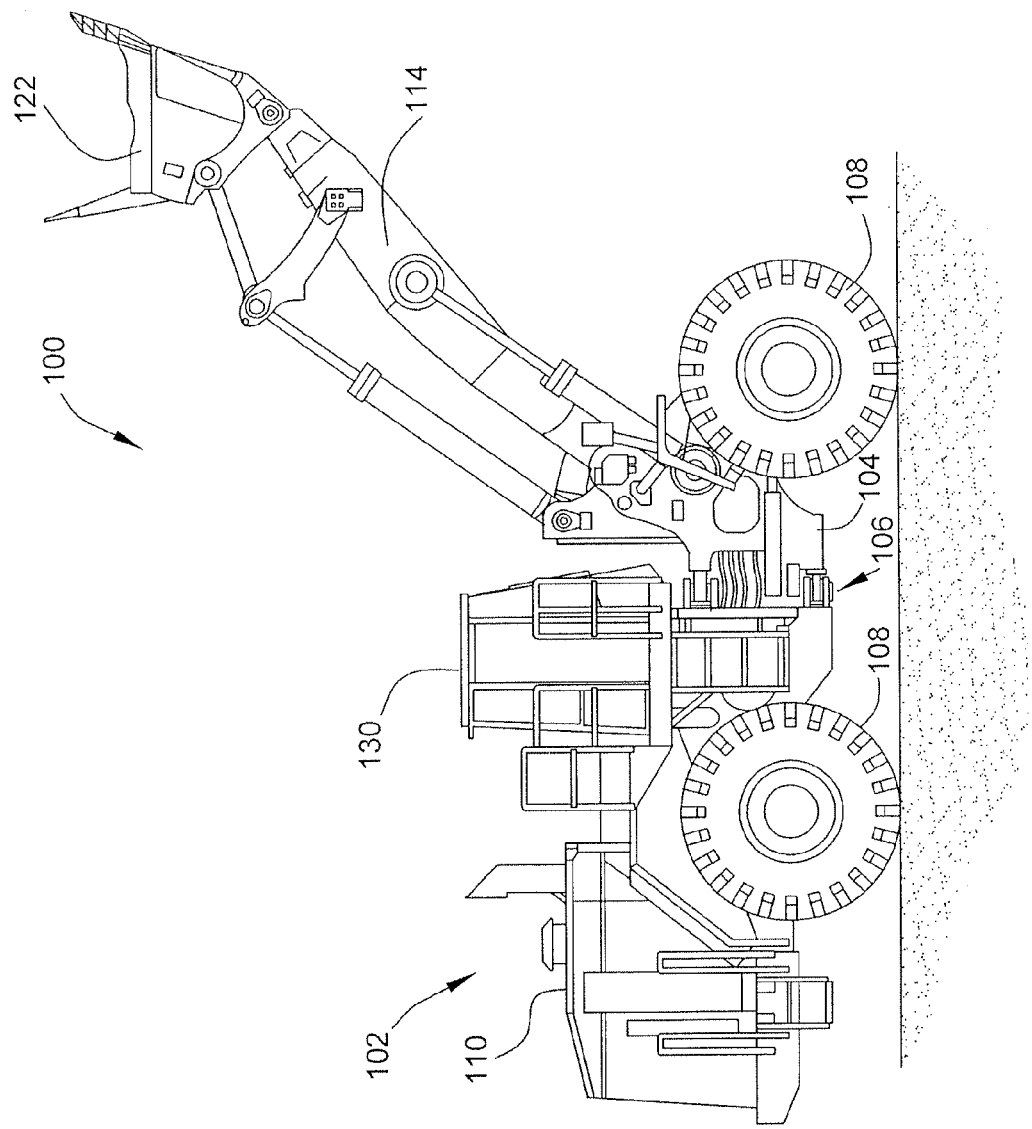
FIG. 1 is a schematic view of a machine in accordance with the disclosure.
Figure 2:
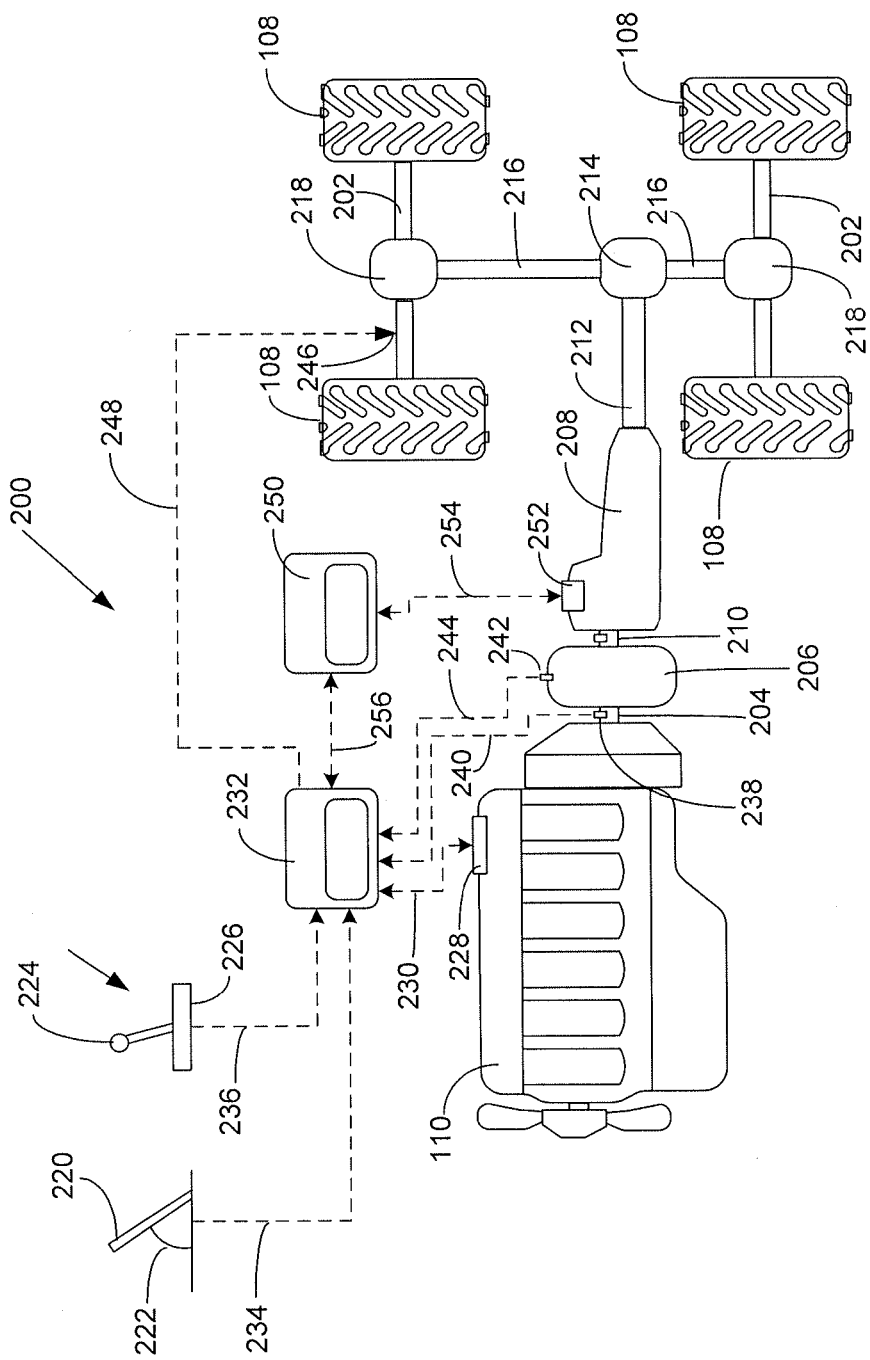
FIG. 2 is a schematic view of a powertrain for a machine in accordance with the disclosure.

FIG. 1 shows an outline of a wheel loader as one example of a vehicle or machine 100. FIG. 2 is a schematic of a powertrain 200 of the vehicle 100. In reference to these figures, the vehicle 100 includes an engine frame portion 102 connected to a non-engine frame portion 104 by an articulated joint 106. Each of the engine frame portion 102 and non-engine frame portion 104 includes a respective axle 202 connected to a set of wheels 108. The engine frame portion 102 includes the engine 110, which has an output shaft 204 connected to a torque converter 206. The torque converter 206 is in turn connected to a transmission 208 via a connecting shaft 210. An output shaft 212 of the transmission 208 is connected to a splitter 214 that powers two drive shafts 216, one for each axle 202. Each drive shaft 216 transmits power to the wheels 118 via a respective differential 218 such that rotational power provided at the engine output shaft 204 is effectively transmitted to the wheels 108. Although two driven axles 202 are shown, a single axle or more than two axles may be used depending on the type of vehicle. Moreover, although wheels are shown, other types of ground engaging members, such as tracks, may be used.

The vehicle 100 further includes an operator cab 130 that houses various machine control devices. As shown in FIG. 2, such devices include an accelerator pedal 220 having an accelerator pedal sensor (APS) 222, and a gear selector lever 224 having a lever encoder 226. The APS 222 and lever encoder 226 may be configured to provide signals indicative of the desired ground speed of the vehicle 100 that is commanded by an operator during use.

Returning now to FIG. 1, the vehicle 100 of the illustrated embodiment includes a work implement, which in this case is a bucket 122 connected at the end of a pair of lift arms 114 that are pivotally connected to the non-engine frame portion 104 of the vehicle 100 at a hinge 116.

As shown in FIG. 2, the engine 110 has an interface 228 that is connected to a communication channel 230 with an engine governor 232. The engine governor 232 operates to monitor and control the function of various engine systems, such as monitor sensor readings from various engine sensors, control engine speed and load output and so forth, by receiving information and transmitting commands to various engine components through the communication channel 230. As shown, the engine governor 232, or another controller connected to the governor 232, is further connected to various vehicle components that can control the operation of the engine. In the illustrated embodiment, the governor 232 is an electronic controller that includes a processor operably associated with other electronic components such as a data storage device and the various communication channels. In the illustration of FIG. 2, a throttle communication channel 234 and a gear selection encoder communication channel 236 are connected to the governor 232 and configured to provide to the governor 232 information indicative of the operator's commands, such as the desired engine speed or load, the desired gear selection setting, and the like. It should be appreciated that additional or alternative connections between the governor 232 and the various engine and/or vehicle systems may be present but are not shown for simplicity.

The governor 232 is further configured to receive information indicative of the operation of the remaining portion of the powertrain 200. In this way, the governor 232 is connected to an engine output shaft speed sensor 238 via an engine speed communication channel 240, a torque converter locked state sensor 242 via a torque converter communication channel 244, and to a vehicle ground speed sensor 246 via a ground speed communication channel 248.

The powertrain 200 in the illustrated embodiment includes a transmission controller 250 that is configured to control the operation of the transmission 208. Accordingly, the transmission controller 250 is connected to an interface 252 of the transmission 208 via a transmission communication channel 254. The interface 252 may include structures that can selectively engage and disengage various gear sets of the transmission 208 in response to commands from the transmission controller 250, as well as provide information to the transmission controller 250 indicative of the current gear engagement state of the transmission 208, as well as other information, such as the power transmitted to the wheels 108 through the transmission 208, the speed of the output shaft 212, the speed of the connecting shaft 210, and the like. During operation, the transmission controller 250 may command gear changes to the transmission 208 based on predetermined connecting shaft 210 speed thresholds for up-shift and downshift changes.

In the illustrated embodiment, information may be exchanged between the engine governor 232 and the transmission controller 250 via a data bus 256, but it should be appreciated that although the engine governor 232 and the transmission controller 250 are shown as separate components they may alternatively be integrated into a single control unit or separated into more than two control units. Thus, either of the engine governor 232 and/or the transmission controller 250 may be a single controller or may include more than one controller disposed to control various functions and/or features of a machine. For example, a master controller, used to control the overall operation and function of the machine, may be cooperatively implemented with a motor or engine controller, used to control the engine 110. In this embodiment, the terms "controller" or "governor" are meant to include one, two, or more controllers that may be associated with the machine 100 and that may cooperate in controlling various functions and operations of the machine 100 (FIG. 1). The functionality of these devices, while shown conceptually in the figures that follow to include various discrete functions for illustrative purposes only, may be implemented in hardware and/or software without regard to the discrete functionality shown. Accordingly, although various interfaces of the controller are described relative to components of the powertrain system in the figures that follow, such interfaces are not intended to limit the type and number of components that are connected, nor the number of controllers that are described.

Figure 3:
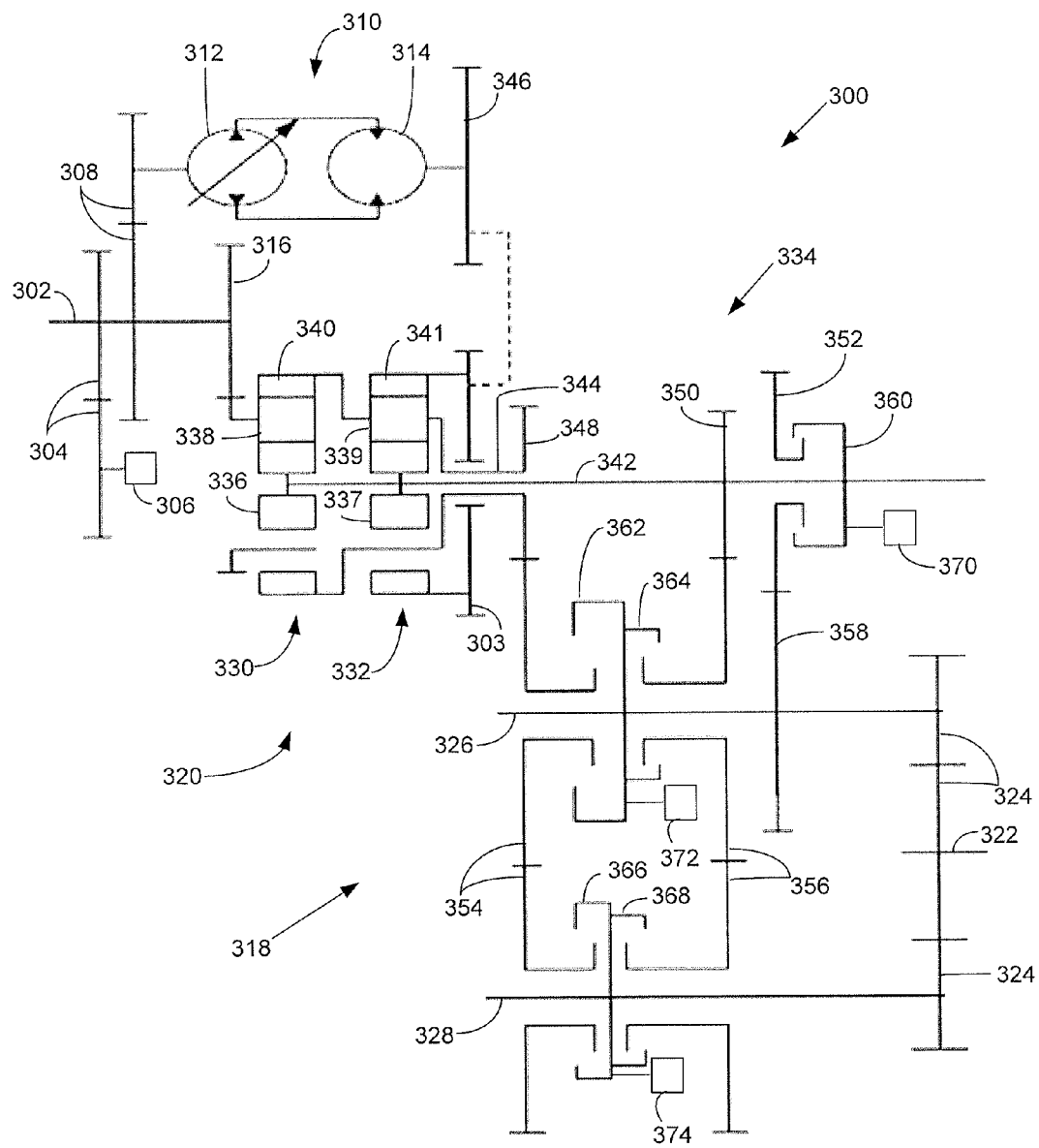
FIG. 3 is diagrammatic view of a hydro-mechanical transmission in accordance with the disclosure.

A schematic diagram of a hydro-mechanical transmission 300 in accordance with the disclosure is shown in FIG. 3. The transmission 300 includes an input shaft 302 having an input gear set 304 connected to an impeller shaft of a pump 306. The input shaft 302 is also connected to a second input gear set 308 that drives a variator 310, which in the illustrated embodiment includes a variable-displacement hydraulic pump 312 that is fluidly interconnected with and arranged to operate a hydraulic motor 314. The input shaft 302 is also connected to a mechanical transmission input gear 316. In this way, power input to the transmission 300, for example, by an engine (see engine 110 in FIG. 2) or another prime mover such as an electric motor, can be split into power provided to the variator 310 or to a mechanical transmission 318 system.

The mechanical transmission 318 includes a planetary gear arrangement 320 and a combined output shaft 322, which is connected by an output gear set 324 to first and second output members 326 and 328. In the illustrated embodiment, the first output member 326 provides a driving motion in the forward machine travel direction, and the second output member 328 provides a driving motion in the reverse machine travel direction. The planetary gear arrangement 320 includes first and second axially aligned planetary gear sets 330 and 332, and a planetary output shaft 334. The first planetary gear set 330 includes a sun gear 336, a carrier 338, and a ring gear 340. The second planetary gear set includes a sun gear 337, a carrier 339, and a ring gear 341. The planetary output shaft 334 includes an internal shaft 342 and a sleeve 344. The sleeve 344 is disposed in axial alignment over a portion of the internal shaft 342 and can be embodied as a hollow shaft or hub that is supported by the internal shaft 342. The internal shaft 342 is connected to the sun gears 336 and 337 of the first and second planetary gear sets 330 and 332. The sleeve 344 is connected to the carrier 339 of the second planetary gear set 332, which is also connected to the ring gear 340 of the first planetary gear set 330. The mechanical transmission input gear 316 is connected to the carrier 338 of the first planetary gear set 330. The ring gear 341 of the second planetary gear set 332 is connected to an output gear 346 of the hydraulic motor 314 of the variator 310.

The planetary output shaft 334 includes first, second and third planetary output gears 348, 350 and 352. The first planetary output gear 348 is connected to the sleeve 344 such that motion of the ring gear 340 of the first planetary gear set 330 and/or motion of the carrier 339 of the second planetary gear set 332 is transferred through the first planetary output gear 348 to a first set of drive gears 354 that includes two gears, one of which is disposed to rotate around the first or second output member 326 and 328. The second planetary output gear 350 is connected to the internal shaft 342 such that rotation of the sun gears 336 and 337 of the first and second planetary gear sets 330 and 332 is transferred through the second planetary output gear 350 to a second set of drive gears 356 that also includes two gears, one of which is disposed to rotate around the first or second output member 326 and 328. Finally, the third planetary output gear 352 is disposed to rotate around the internal shaft 342 and is connected to a third drive gear 358 that is connected to the first output member 326.

In operation, the input shaft 302 delivers split input power to the variator 310 and to the planetary gear arrangement 320. The planetary gear arrangement 320 combines the hydrostatic output power from a second planetary gear arrangement input gear 303 with the split input mechanical power to provide hydro-mechanical output power for application to a load, such as one or more driving wheels of a vehicle, tracks of an earth-working machine, or the like. As can be appreciated, the speed and torque in each of the power ranges initially set by gear ratios of the planetary gear arrangement 320 can be infinitely varied by varying the stroke of the hydraulic pump 312 of the variator 310.

During operation, power from the input shaft 302 directly and/or through the variator 310, which is selectively subjected to an appropriate gear ratio through the planetary gear arrangement 320, is provided to the output shaft 322 by selective engagement of at least one of five clutches. More specifically, an auxiliary or first clutch 360 is connected to the internal shaft 342 and is configured to engage and power the third planetary output gear 352 such that, when the first clutch 360 is engaged, rotation of the internal shaft 342 is transferred to the first output shaft 326 via the third planetary output gear 352 and the third drive gear 358. A second clutch 362 is connected to the first output shaft 326 and, when engaged, is configured to receive driving power from the first set of drive gears 354 such that the first output shaft 326 is driven by the first planetary output gear 348. A third clutch 364 is connected to the first output shaft 326 and, when engaged, is configured to receive driving power from the second set of drive gears 356 such that the first output shaft 326 is driven by the second planetary output gear 350. In other words, the first output shaft 326 can be driven by the first planetary output gear 348 when the second clutch 362 is engaged, by the second planetary output gear 350 when the third clutch 364 is engaged, and by the third planetary output gear 352 when the first clutch 360 is engaged.

In a similar configuration, a fourth clutch 366 is connected to the second output shaft 328 and can selectively engage a hub connected to the first set of drive gears 354, and a fifth clutch 368 is connected to the second output shaft 328 and can selectively engage a hub connected to the second set of drive gears 356. In this way, the second output shaft 328 can be driven by the first planetary output gear 348 via the first set of drive gears 354 when the fourth clutch 366 is engaged, and by the second planetary output gear 350 via the second set of drive gears 356 when the fifth clutch 368 is engaged.

In the embodiment shown, each of the five clutches 360, 362, 364, 366 and 368 can include a clutch pack or, stated differently, a plurality of clutch disks, that can be selectively engaged by action of a dedicated actuator that is responsive to a control signal. In this way, a first actuator 370 is associated with the first clutch 360 and configured to engage the first clutch when an appropriate activation signal is operably provided to the first actuator 370 by an electronic controller, which in this case is the transmission controller 250 (FIG. 2). The second and third clutches 362 and 364 are shown as a compound clutch that can be selectively engaged by action of a second actuator 372, which is also responsive to signals from the transmission controller 250 and which may include two separate actuators, one for each clutch. Similarly, the fourth and fifth clutches 366 and 368 are also formed as a compound clutch that is associated with a third actuator 374, which may also include two separate actuators configured to engage and disengage each of the compound clutches. Each of the first, second and third actuator 370, 372 and 374 can be embodied as any appropriate type of clutch actuator known in the art, such as mechanical linkage, a hydraulic or electric actuator, and others. In the illustrated embodiment, the actuators are hydraulic pistons wherein the flow of hydraulic fluid to operate each piston is controlled by an electromechanical solenoid valve in the known fashion.

Based on the foregoing, the illustrated embodiment for the hydro-mechanical transmission 300 is capable of providing three forward and two reverse gear ratios for motion, as illustrated in Table 1 below, depending on which clutch is engaged:

TABLE 1

| Direction | Speed | First Clutch 360 | Second Clutch 362 | Third Clutch 364 | Fourth Clutch 366 | Fifth Clutch 368 |
|---|---|---|---|---|---|---|
| Forward | Low | off | ON | off | off | off |
| | High | off | off | ON | off | off |
| | Auxiliary | ON | off | off | off | off |
| Reverse | Low | off | off | off | ON | off |
| | High | off | off | off | off | ON |

As can be seen from the table above, each of the five clutches 360 through 368 provides a particular combination of speed and direction of travel of the machine, without use of a synchronizer or other motion transfer device. A main advantage of this drive configuration is the reduced cost and increased reliability of the transmission 300 when compared to other, known transmission configurations. Further, when a shift from one gear to another is desired, the shift can occur rather quickly in that it merely requires the disengagement of one clutch and the engagement of another, which can be accomplished in a relatively short time and thus provide good shift quality that is barely perceptible to the machine operator. In the particular embodiment shown, different clutch actuators are used when shifting between successive gears, which increases the shift speed. For example, and in reference to Table 1 and FIG. 3, when moving in the forward direction and shifting from the "Low" to the "High" speed setting, the second clutch 362 by operation of the second actuator 372 is disengaged and the third clutch 364 is engaged by operation of the third actuator 374. Such simultaneous operation of the second and third actuators 372 and 374 can save time as compared to the actuation of a single actuator tasked with disengaging one clutch before engaging another. As used herein, simultaneous operation is intended to refer to operation that is completed within a short time period, for example, a time period that is less than about 250 milliseconds.

In the transmission 300, gear changes can be accomplished smoothly when, with the aid of the variator 310, shifts are carried out at a relative speed of about zero between the outgoing and incoming gears. More specifically, the variator is used to adjust the speed of the ring gear 341 of the second planetary gear set 332 (see FIGS. 3 and 4) such that the sleeve 344 (FIG. 3) can be at a zero rotation speed when the machine or vehicle is stationary notwithstanding the rotational input provided by the engine to the input shaft 302. This can be accomplished by driving the variator output gear 346 in a reverse direction. At this time, the internal shaft 342 (FIG. 3) is rotating at a high speed. As the machine begins to move, the sleeve 344 begins to accelerate, the internal shaft 342 begins to decelerate, and the variator 310 begins to decelerate and, when it reaches a zero speed, reverses direction and begins to accelerate in the opposite direction. A shift, for example, between a low and a high gear, occurs when the speeds of the sleeve and internal shaft are matched. This process is mirrored for downshift gear changes, and is controlled by a transmission controller, for example, the controller 250 (FIG. 2), based on various input parameters relative to the speed of the machine and/or the speed of transmission components that are monitored during operation.

INDUSTRIAL APPLICABILITY

The present disclosure is applicable to hydro-mechanical transmissions and, more particularly, to hydro-mechanical transmissions for use in medium to heavy-duty applications, both for on-highway vehicles as well as for off-highway and earth-moving machines. The disclosure provides systems and methods for hydro-mechanical transmissions, for which exemplary embodiments of transmissions having three forward and two reverse gears are presented. It is contemplated, however, that the structures and methods described herein can be adapted for transmissions having fewer or more than three forward gears and/or fewer or more than two reverse gears. Accordingly, the disclosed systems and methods should be considered for their general teachings in addition to their specific implementations.

Figure 4:
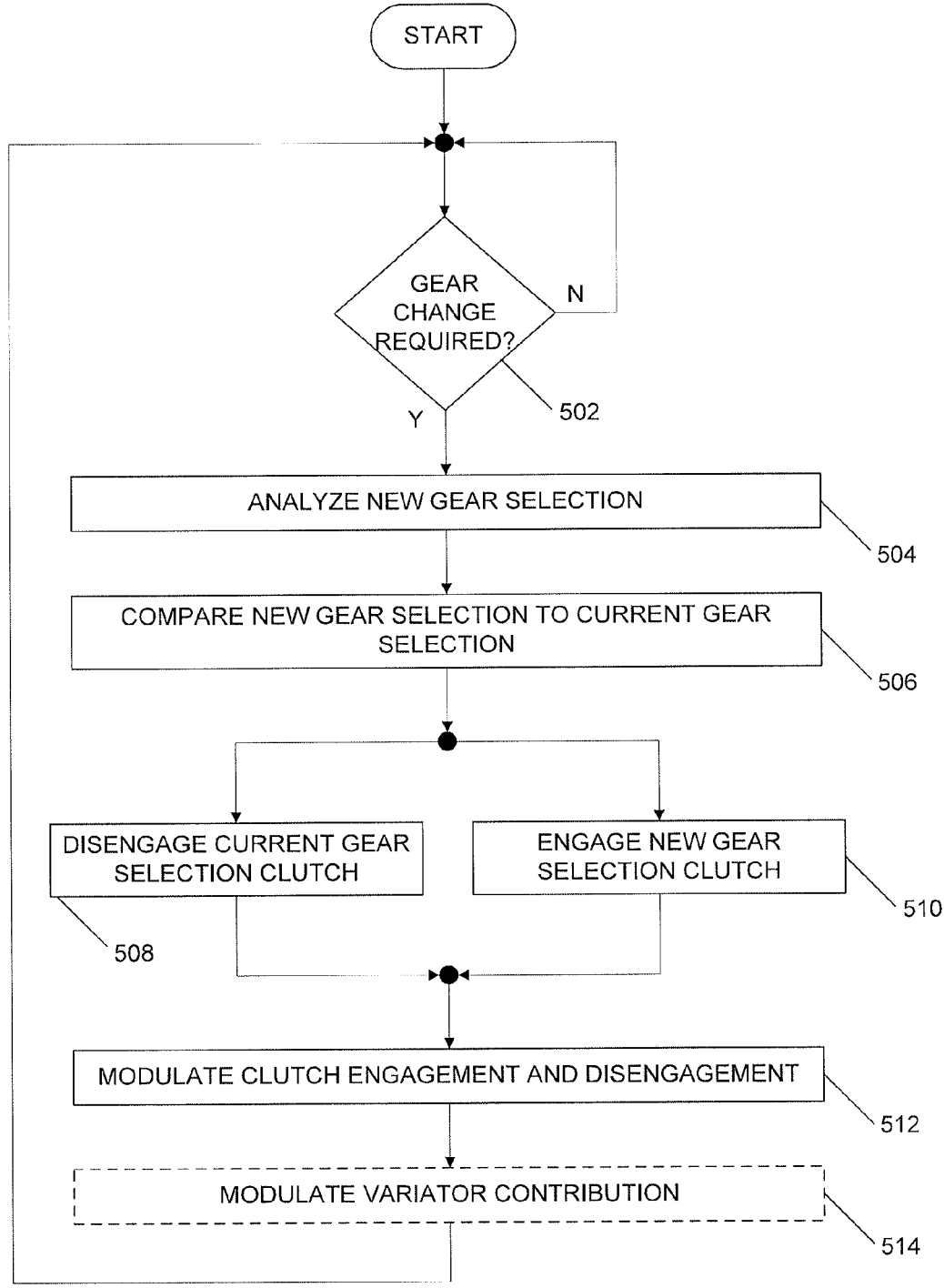
FIG. 4 is a flowchart for a method of operating a hydro-mechanical transmission in accordance with the disclosure.

A flowchart for a method of operating a hydro-mechanical transmission is shown in FIG. 4. The process begins by a decision being made in a transmission controller to change a gear in a transmission from a current gear selection to a new gear selection at 502. The decision to change from the current to the new gear selection may be based on a determination in the controller that a shift is required based on various operating parameters of the transmission, such as the speed and/or torque of the transmission's input and/or output shaft, or may alternatively (or additionally) be a decision by an operator or another controller of the machine that is relayed to the transmission controller.

The transmission controller may analyze the new gear selection at 504 to determine the direction and desired gear ratio of the new gear selection. For example, in the transmission 300 previously described, the transmission controller may analyze the new gear selection to determine whether it is a forward or reverse gear and whether it is a low, high, or auxiliary gear ratio. The transmission controller may then compare the new gear selection to parameters of the current gear selection at 506 to determine which clutch of the transmission should be disengaged to release the current gear selection, and also which clutch should be engaged to adopt the new gear selection. In a coordinated fashion, for example, when a substantially zero relative speed is present between the current gear ratio gears and the new gear ratio gears, the transmission controller may disengage a single clutch at 508 to release a current gear selection, and engage a single clutch at 510 to adopt the new gear selection. The transmission controller may optionally modulate the disengagement and engagement of the clutches at 512, as well as modulate a pump displacement at a variator that is associated with the transmission and which provides hydraulic assistance to the ring of at least one planetary gear system at 514, to ensure that a shift is as smooth as desired, and the process can repeat.

The operations described relative to the flowcharts presented are operations that may be performed by the electronic controller 250 and/or the governor 232 shown in FIG. 2 in accordance with appropriate control algorithms being executed therein. That is, the disclosed processes may be executed by an electronic controller via the execution of computer-executable instructions, e.g., in machine language form or otherwise, read from a computer-readable medium, e.g., volatile or permanent memory, magnetic or optical discs, or other tangible media. While the methodology is described with reference to the electronic controllers shown in FIG. 2, the method is applicable to any controller that monitors and controls the operation of a transmission in a machine or vehicle powertrain. Also, while particular sequences are described above, such description is shown for convenience and it should be understood that the disclosure is applicable to controlling the operation of a transmission according to different steps as well.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:

1. A machine powertrain that includes an engine connected to a continuously variable transmission, the continuously variable transmission comprising:
   a planetary gear arrangement having an input, and at least a first output and a second output;
   a variator including a variable displacement hydraulic pump operably associated with a hydraulic motor, the hydraulic motor configured to drive a gear set of the planetary gear arrangement;
   an input shaft driven by the engine and configured to drive the variator and the input of the planetary gear arrangement;
   a first planetary output gear connected to the first output of the planetary gear arrangement;
   a second planetary output gear connected to the second output of the planetary gear arrangement;
   a third planetary output gear connectable via a first clutch to the second output of the planetary gear arrangement;
   a first output member and a second output member of the transmission, the first output member being connected to the third planetary output gear, the first and second output members being interconnected with a transmission output;
   a second clutch configured to releasably connect the first output member with the first planetary output gear;
   a third clutch configured to releasably connect the first output member with the second planetary output gear;
   a fourth clutch configured to releasably connect the second output member with the first planetary output gear; and
   a fifth clutch configured to releasably connect the second output member with the second planetary output gear.

2. The machine of claim 1, wherein the first and second output members are configured to rotate in opposite directions.

3. The machine of claim 1, wherein the second and third clutches are integrated into a single compound clutch.

4. The machine of claim 1, wherein the fourth and fifth clutches are integrated into a single compound clutch.

5. The machine of claim 1, wherein the planetary gear arrangement includes first and second gear sets, each gear set having a sun gear, a carrier gear, and a ring gear, wherein the sun gears of the first and second gear sets are connected to the second output of the planetary gear arrangement, and wherein the ring gear of the first gear set and the carrier gear of the second gear set are connected to the first output of the planetary gear arrangement.

6. The machine of claim 5, wherein the input of the planetary gear arrangement is connected to the carrier gear of the first gear set, and wherein the variator is connected to the ring gear of the second gear set.

7. The machine of claim 1, wherein a first forward gear is engaged when the first clutch is engaged, a second forward gear is engaged when the second clutch is engaged, a third forward gear is engaged when the third clutch is engaged, a first reverse gear is engaged when the fourth clutch is engaged, and a second reverse gear is engaged when the fifth clutch is engaged.

8. The machine of claim 1, wherein a first set of drive gears interconnects the first planetary output gear with the second and fourth clutches, and wherein a second set of drive gears interconnects the second planetary output gear with the third and fifth clutches.

9. A continuously variable transmission, comprising:
   a planetary gear arrangement having a first output and a second output, the planetary gear arrangement including first and second gear sets, each gear set having a sun gear, a carrier gear, and a ring gear, wherein the ring gear of the first gear set is connected to the carrier gear of the second gear set, the second output is connected to the sun gears of the first and second gear sets, and wherein the first output is connected to the ring gear of the first gear set and to the carrier gear of the second gear set;
   a variator including a variable displacement hydraulic pump operably associated with a hydraulic motor, the hydraulic motor having an output connected to the ring gear of the second gear set;
   an input shaft connected to the variable displacement hydraulic pump of the variator and to the carrier gear of the first gear set;
   a first planetary output gear connected to the first output of the planetary gear arrangement;
   a second planetary output gear connected to the second output of the planetary gear arrangement;
   a third planetary output gear connectable via a first clutch to the second output of the planetary gear arrangement;
   a first output member and a second output member of the transmission, the first output member being connected to the third planetary output gear, the first and second output members being interconnected with a transmission output;
   a second clutch configured to releasably connect the first output member with the first planetary output gear;
   a third clutch configured to releasably connect the first output member with the second planetary output gear;
   a fourth clutch configured to releasably connect the second output member with the first planetary output gear; and
   a fifth clutch configured to releasably connect the second output member with the second planetary output gear.

10. The continuously variable transmission of claim 9, wherein the first and second output members are configured to rotate in opposite directions.

11. The continuously variable transmission of claim 9, wherein the second and third clutches are integrated into a single compound clutch.

12. The continuously variable transmission of claim 9, wherein the third and fourth clutches are integrated into a single compound clutch.

13. The continuously variable transmission of claim 9, wherein a first forward gear is engaged when the first clutch is engaged, a second forward gear is engaged when the second clutch is engaged, a third forward gear is engaged when the third clutch is engaged, a first reverse gear is engaged when the fourth clutch is engaged, and a second reverse gear is engaged when the fifth clutch is engaged.

14. The continuously variable transmission of claim 9, wherein a respective one of three forward gears and two reverse gears is engaged when each of the first, second, third, fourth, and fifth clutches is engaged while the remaining clutches are disengaged.

15. The continuously variable transmission of claim 14, wherein a shift from a current gear selection to a new gear selection includes a disengagement of one clutch and the engagement of another clutch, the clutch and the another clutch selected from the group consisting of the first clutch, second clutch, third clutch, fourth clutch and fifth clutch.

16. The continuously variable transmission of claim 9, wherein a first set of drive gears interconnects the first planetary output gear with the second and fourth clutches, and wherein a second set of drive gears interconnects the second planetary output gear with the third and fifth clutches.

17. A method for operating a continuously variable transmission, comprising:
   determining by a processor whether a shift from a current gear selection to a new gear selection is required;
   analyzing by the processor parameters of the new gear selection;
   comparing by the processor the parameters of the new gear selection to parameters of the current gear selection;
   disengaging a current gear selection clutch and engaging a new gear selection clutch within a short time period;
   modulating the disengaging and the engaging operations, and further modulating a variator contribution to ensure that a gear speed difference between the current gear selection and the new gear selection is substantially zero.

18. The method of claim 17, wherein the short time period is less than 250 milliseconds.

19. The method of claim 17, wherein the continuously variable transmission is configured for three forward-travel gear selections and two reverse-travel gear selections, wherein the continuously variable transmission includes five clutches, and wherein each of the five clutches corresponds to one of the three forward-travel and two reverse-travel gear selections.

20. The method of claim 17, wherein at least one of the analyzing, comparing, engaging, disengaging and modulating is accomplished in a transmission controlled configured to execute computer executable instructions stored in a tangible medium.

\* \* \* \* \*